United States Patent
Castelain

(10) Patent No.: US 6,876,672 B1
(45) Date of Patent: Apr. 5, 2005

(54) METHOD OF TRANSMITTING DATA ON MULTIPLE CARRIERS FROM A TRANSMITTER TO A RECEIVER AND RECEIVER DESIGNED TO IMPLEMENT THE SAID METHOD

(75) Inventor: Damien Castelain, Rennes (FR)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 707 days.

(21) Appl. No.: 09/624,858

(22) Filed: Jul. 24, 2000

(30) Foreign Application Priority Data

Oct. 8, 1999 (FR) .......................................... 99 12610

(51) Int. Cl.[7] .................................................. H04J 1/00
(52) U.S. Cl. .................... 370/483; 370/206; 370/210; 370/481; 370/482; 370/484
(58) Field of Search ................. 370/203–210, 370/480, 481, 482, 483, 484

(56) References Cited

U.S. PATENT DOCUMENTS

| | | | | |
|---|---|---|---|---|
| 5,313,169 A | * | 5/1994 | Fouche et al. ............... | 329/302 |
| 5,444,697 A | * | 8/1995 | Leung et al. ................ | 370/207 |
| 5,506,836 A | * | 4/1996 | Ikeda et al. ................. | 370/203 |
| 5,521,943 A | * | 5/1996 | Dambacher ................. | 375/295 |
| 5,732,113 A | * | 3/1998 | Schmidl et al. ............. | 375/355 |

FOREIGN PATENT DOCUMENTS

| | | |
|---|---|---|
| EP | 0836304 A2 | 4/1998 |
| EP | 0903898 A2 | 3/1999 |
| FR | 2743967 | 7/1997 |

OTHER PUBLICATIONS

"Low–Overhead, Low–Complexity (Burst) Synchronization for OFDM" Timothy M. Schmidl, et al., IEEE International Conference on Communications (ICC), 1996, pp. 1301–1306.

* cited by examiner

*Primary Examiner*—Wellington Chin
*Assistant Examiner*—Kevin Mew
(74) *Attorney, Agent, or Firm*—Birch, Stewart, Kolasch & Birch, LLP

(57) ABSTRACT

A method of transmitting data on multiple carriers is disclosed, the method consisting, on a transmitter side, of binary to signal coding of the data to be transmitted so as to form modulation signals, of modulating a plurality of sub-carriers with the modulation signals as to form symbols, referred to as OFDM symbols, and then of transmitting, over a channel between the transmitter and a receiver, the OFDM symbols at a rate which is related to a sampling frequency referred to as the transmitter sampling frequency, and, on the receiver side, of determining, from a clock signal at a frequency related to a sampling frequency referred to as the receiver sampling frequency, an analysis window for the signal received from the transmitter so as to form a block of samples, and of estimating the transmitted modulation signals by demodulating the sub-carriers for the block of samples under consideration.

22 Claims, 4 Drawing Sheets

METHOD OF TRANSMITTING DATA ON MULTIPLE CARRIERS FROM A TRANSMITTER TO A RECEIVER AND RECEIVER DESIGNED TO IMPLEMENT THE SAID METHOD

FIELD OF THE INVENTION

The present invention concerns a method of transmitting data on multiple carriers from a transmitter to a receiver of a data transmission system using multiple carrier modulation, also referred to as OFDM (Orthogonal Frequency Division Multiplex). It also concerns a receiver which is particularly intended to implement the said data transmission method.

BACKGROUND OF THE INVENTION

The technique of modulation on multiple carriers, referred to as OFDM, is known and consists of distributing the data to be transmitted over a large number of sub-carriers, which makes it possible to obtain a symbol time appreciably longer than the spread of the pulse response of the transmission channel between a transmitter and a receiver of the said transmission system. This technique is perfectly adapted to radio transmissions, with fixed, mobile or portable reception.

A description of a transmission system of the OFDM (Orthogonal Frequency Division Multiplex) type can be found in an article entitled "Principles of modulation and channel coding for digital broadcasting for mobile receivers", which appeared in EBU Review n° 224, pp 168–190 of August 1987 in the name of R. Lasalle and M. Alard.

Such a transmission system is depicted in FIG. 1 and is now described. It consists essentially of a transmitter 10 in communication with a receiver 20 by means of a transmission channel 30.

The data to be transmitted are first of all subject, in a unit 12, to a binary to signal coding which consists of a process of modulation, for example, a modulation of the QPSK (Quadrature Phase Shift Keying) type, or of the 16 QAM (16 Quadrature Amplitude Modulation) type, or of the 64 QAM type. The unit 12 delivers signals which are hereinafter referred to as modulation signals and which belong to a modulation alphabet which depends on the type of modulation used by the unit 12.

In a framing unit 13, the modulation signals delivered by the unit 12 are then put in the form of frames with possibly the insertion of reference signals (insertion of reference symbols, insertion of distributed pilots, etc) which may prove necessary to certain processings, on the receiver side, such as synchronization processings.

The modulation signal frames delivered by the unit 13 modulate, in a unit 14, a plurality of sub-carriers with distinct Respective frequencies. This modulation carried out by the unit 14 consists, for example, of the application of an inverse Fourier transform to blocks of modulation signals contained in the frames issuing from the unit 13. The unit 14 delivers signals which are hereinafter referred to as OFDM symbols.

The OFDM symbols issuing from the modulation unit 14 are subject to a digital to analogue conversion in a conversion unit 15.

All the processings implemented in the transmitter 10 are synchronized by means of a time base so that the OFDM symbols delivered by the modulation unit 14 are delivered at a sampling frequency $f_e^E$ referred to as the transmitter sampling frequency.

It should be noted that the modulation unit 14 can provide a guard time between each OFDM symbol, which makes it possible to reduce, or even eliminate, any interference between consecutive symbols. For example, the guard time of a symbol is a replica of the end of the previous symbol and its length is chosen so that its duration is greater than that of almost all the echoes to which the transmission channel 30 is subject.

It should be noted that the data to be transmitted can previously be subject to a coding which can be of the type with convolution, of the type with convolution with an external Reed-Solomon code, of the type with codes referred to as turbo-codes or others. They can also have been subject to an interleaving which can be of the frequency type, that is to say an interleaving of the length of an OFDM symbol, or of the frequency and time type, notably when the interleaving extends over a larger number of symbols. This term "frequency and time interleaving" refers to the time-frequency representation of the OFDM signal.

FIG. 2 depicts an OFDM symbol with a guard time GI of duration $T_{GI}$ and a part containing the useful data of duration $T_U$. The total duration of the symbol is denoted $T_S$.

The analogue signal delivered by the unit 15 is then transmitted by a transmission unit 17 over the transmission channel 30 modulating a carrier at a frequency, denoted in the remainder of the description $f_0^E$. The frequency $f_0^E$ is also generated by the time base 16.

It should also be noted that the transmitter sampling frequency $f_e^E$ could be proportional to the transmission carrier frequency $f_0^E$.

In order to recover the transmitted data, the receiver 20 performs the operations which are the inverse of those performed by the transmitter 10. To do this, the receiver 20 has a receiving unit 27 designed to transpose into baseband the signal received from the channel 30 by means of a carrier detection signal of frequency $f_0^R$ delivered by the time base 26. The sampling frequency $f_e^R$ is possibly proportional to the carrier detection frequency $f_0^R$.

The receiver 20 also comprises an analogue to digital conversion unit 21 which is provided for delivering digital samples to the input of a unit 22 providing the demodulation of the sub-carriers which were used during the modulation performed by the modulation unit 14 of the transmitter 10.

According to one possible embodiment, the demodulation unit 22 uses a Fourier transform.

From the signal delivered by the demodulation unit 22, an estimation unit 23 performs an estimation of the modulation signals which were transmitted by the unit 12. To do this, the estimation unit 23 performs a correction of the phase shift and the amplitude changes caused by the multipath transmission channel 30.

The demodulated symbols are then decoded in a decoding unit 24 which is the dual of the coding unit 12:

All the units 21 to 24 are synchronized and, to do this, are clocked, by means of a time base 26, at a frequency which is related to a sampling frequency $f_e^R$, referred to in the remainder of the description as the receiver sampling frequency. In particular, the signal delivered by the conversion unit 21 is in the form of samples clocked at this receiver sampling frequency $f_e^R$. As for the unit 22, this demodulates blocks of samples which are grouped together within a window, hereinafter referred to as the analysis window, determined from a clock signal at a frequency related to the said receiver sampling frequency $f_e^R$.

FIG. 2 depicts this analysis window F positioned at a time $t_n$ with respect to the start of the symbol under consideration.

It should be noted that, if the demodulation unit 22 ignores the data outside the analysis window, it does not carry but analysis of the samples constituting the guard time.

The estimation unit 23 can have a deframing unit 23a and a demodulation unit proper 23b. The demodulation unit 23b performs a demodulation which can be either a coherent demodulation with or without reference symbols, with or without pilots, or a differential demodulation according to the modulation performed by the coding unit 13. In the case of a coherent demodulation, an estimation of the frequency response of the channel 30 is performed in a unit 23c.

The receiver 20 of such a telecommunications system, like any telecommunications system, poses the problem of its time synchronization and, in particular, the slaving of the receiver sampling frequency $f_e^R$ to the transmitter sampling frequency $f_e^E$.

When this slaving is perfectly achieved, that is to say when the receiver sampling frequency $f_e^R$ is equal to the transmitter sampling frequency $f_e^E$ the processings performed in the receiver 20 are perfectly synchronized with the signal received from the transmitter 10. In particular, the position of the analysis window F used by the demodulation unit 22 can be determined so as to correspond exactly with the symbol to be demodulated.

In addition, as a result in particular of the use of a guard time, there is a certain tolerance on the position of this window.

However, the shift of the receiver sampling frequency $f_e^R$ with respect to the transmitter sampling frequency $f_e^E$ has three main consequences on the demodulation process:

- a loss of orthogonality between the base functions of the received signal and the base functions used for demodulation, resulting in interference between the signals modulating the different sub-carriers of the same OFDM symbol (the distortion introduced then is generally very low and can be considered to be negligible, which is done by the invention),
- a slipping of the analysis window which results in interference between consecutive OFDM symbols when this slippage is greater than an acceptable range, and
- a phase shift between the demodulated signals of two consecutive symbols, a phase shift varying from carrier to carrier and directly related to the variation in the position of the analysis window.

Conventionally, in order to solve this problem of slaving, a feedback loop is used which slaves the receiver sampling frequency $f_e^R$ to the transmitter sampling frequency $f_e^E$, using the analysis of the signals received from the transmitter. However, this solution proves to be relatively cumbersome to implement as a result in particular of the use of a voltage controlled crystal oscillator (VCXO) which is also expensive.

SUMMARY OF THE INVENTION

The aim of the present invention is therefore to propose a method which makes it possible to correct the sampling frequency shift and which facilitates, the implementation of the synchronization of the receiver of an OFDM system, or which can even make it possible to dispense with the slaving of the sampling frequency.

The present invention therefore concerns a method of transmitting data on multiple carriers from a transmitter to a receiver, the said method consisting, on the transmitter side, of binary to signal coding of the data to be transmitted so as to form modulation signals, of modulating a plurality of sub-carriers with the said signals so as to form symbols, referred to as OFDM symbols, and then of transmitting, over the said channel between the said transmitter and the said receiver, the said OFDM symbols at a rate which is related to a sampling frequency referred to as the transmitter sampling frequency, and, on the receiver side, of determining, from a clock signal at a frequency related to a sampling frequency referred to as the receiver sampling frequency, an analysis window for the signal received from the transmitter so as to form a block of samples, and of estimating the said transmitted modulation signals by demodulating the said sub-carriers for the said block of samples under consideration.

According to an essential characteristic of the invention, the said estimation step is designed to correct the changes in the position of the analysis window with respect to the said transmitted signal.

Advantageously, the said estimation step consists of demodulating the said sub-carriers for the said block of samples under consideration and then correcting the effects of the transmission channel between the transmitter and the receiver, the said step of correcting the changes in the position of the analysis window consisting of estimating the phase difference between two consecutive OFDM symbols and using this phase difference during the said correction of the effects of the transmission channel between the transmitter and the receiver.

For estimating the phase difference between two consecutive OFDM symbols, the degree of shift of the sampling frequency of the receiver with respect to that of the transmitter will advantageously be estimated, $$\delta = \delta f_e / f_e^E = (f_e^R - f_e^E) / f_e^E$$

the said phase difference between two consecutive OFDM symbols then being equal to:

$$\beta_{k,n} = 2\pi k \delta T_s / T_u$$

where $T_s$ is the total length of the symbol under consideration and $T_u$ its useful part, k the index of the sub-carrier under consideration and n the index of the OFDM symbol under consideration.

For estimating the phase difference between two consecutive symbols, it will also be possible to take into account the shift decision a for the position of the said analysis window delivered by a window repositioning unit, the said phase difference between two consecutive symbols then being equal to:

$$\beta_{k,n} = 2\pi k \delta T_s / T_u + \alpha T$$

where T is the duration of a sample and α is the shift decision value expressed as a number of samples.

For estimating the phase difference between two consecutive symbols, it will also be possible to take into account solely the shift decision for the position of the said analysis window delivered by a window repositioning unit, the said phase difference between two consecutive symbols then being equal to:

$$\beta_{k,n} = 2\pi k \alpha T / T_u$$

where T is the duration of a sample and α the shift decision value expressed as a number of samples.

BRIEF DESCRIPTION OF THE DRAWINGS

The characteristics of the invention mentioned above, as well as others, will emerge more clearly from a reading of the following description of an example embodiment of a receiver which implements the method described above, the said description being given in relation to the accompanying drawings, amongst which.

DETAILED DESCRIPTION

Figure 1:
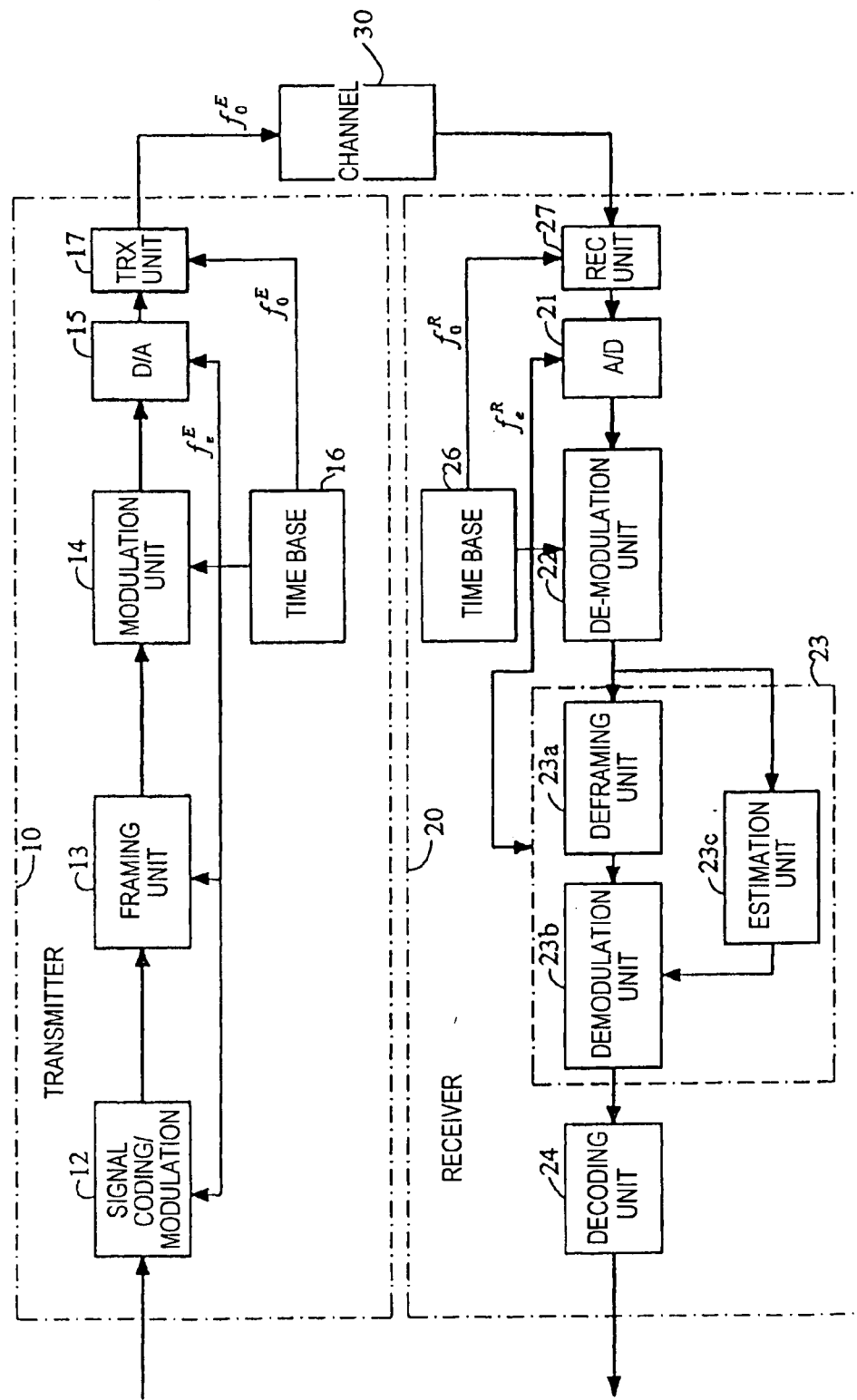
FIG. 1 is a block diagram of an example embodiment of a system for transmitting data on multiple carriers.
Figure 3:
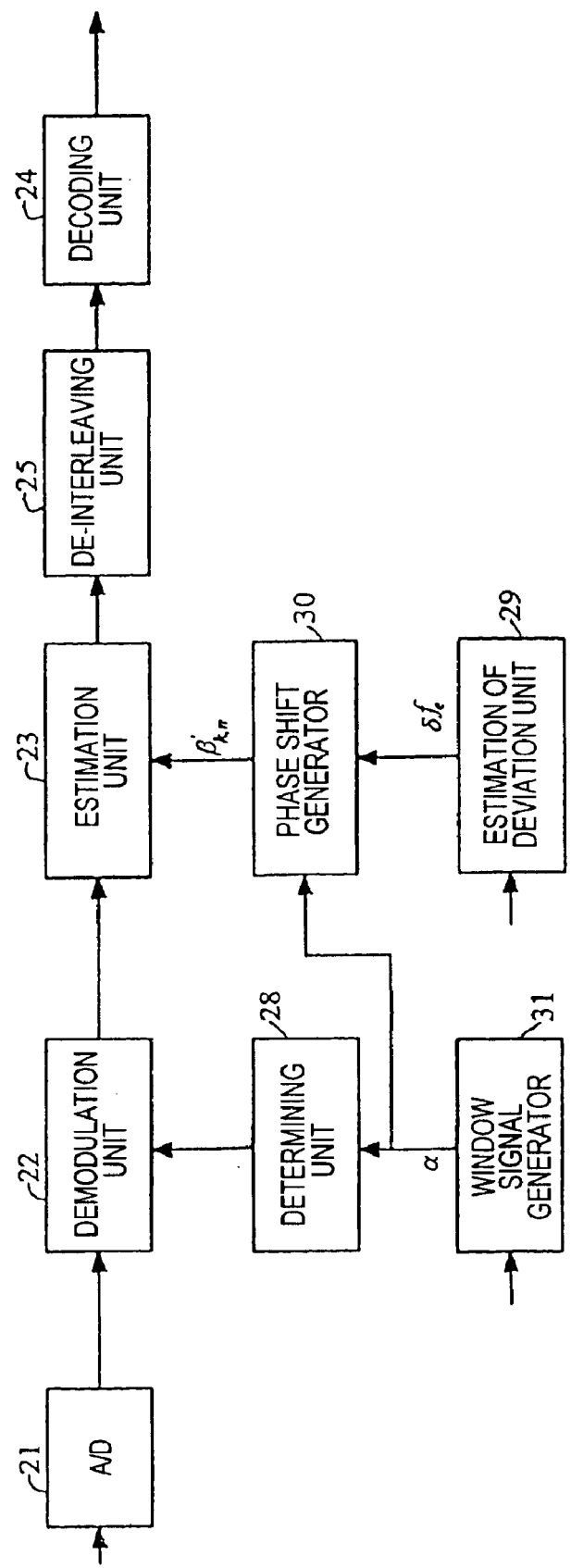
FIG. 3 is a general block diagram of a receiver in a system for transmitting data on multiple carriers which is especially intended for implementing the method of the present invention.

The receiver 20 depicted in FIG. 3 has, like the one depicted in FIG. 1, an analogue to digital conversion unit 21, a demodulation unit 22, for example in the form of a Fourier transform calculation unit, an estimation unit 23, a de-interleaving unit 25 and decoding unit 24.

The demodulation unit 22 and estimation unit 23 are synchronized by means of a time base which delivers a signal to them at a sampling frequency $f_e^R$, referred to as the receiver sampling frequency.

The receiver 20 also has a unit 28 provided for determining, from a clock signal delivered by a time base (not shown) and at a frequency which is related to the receiver sampling frequency $f_e^R$, an analysis window F for the signal delivered by the unit 21. This analysis window F is delivered to the demodulation unit 22 so as to form a block of samples to which the demodulation is applied.

According to the present invention, the estimation unit 23 carries out the demodulation of the received signal by correcting, not only the effect of the transmission channel 30, but also the phase shift which is related to the position of the analysis window F and its drift.

To do this, the receiver 20 of FIG. 3 has a unit 29 which, on the basis of either the signal received by the receiver 20, or the signal output from the demodulation unit 22, delivers an estimation of the deviation 67 $f_e$ of the receiver sampling frequency $f_e^R$ with respect to the transmitter sampling frequency $f_e^E$.

The unit 29 can proceed in different ways depending on whether or not the receiver sampling frequency $f_e^R$ is slaved to the carrier detection frequency $f_0$ of the receiving tuner.

In the first case, the unit 29 incorporates an automatic frequency control (AFC) unit (not shown) which estimates the deviation $\delta f_0$ between the carrier frequency of the transmitting tuner $f_0^E$ and the current carrier detection frequency $f_0^R$ of the receiving tuner and which derives therefrom an estimation of the error $\delta f_e$ using the equation:

$$\frac{\delta f_0}{f_0^E} = \frac{\delta f_0}{f_0^E}.$$

For example, the automatic frequency control (AFC) unit carries out an analysis, on reception, of a known symbol transmitted periodically at the start of each frame and from there gives an estimation of the shift in the carrier frequency $\delta f_0$.

It can also use two consecutive known symbols, transmitted at the start of the burst, and measure, for each carrier, the phase shift between the two received symbols.

It can also use "continuous pilots": certain fixed carriers in the frame continuously transmit known values. These continuous pilots correspond to a frequency "comb". Seeking the position of this comb on reception gives a first rough estimation of the carrier frequency phase shift $\delta f_0$. A finer estimation is then obtained by measuring the value of the phase shift between two consecutive received OFDM symbols, for the carriers of this comb.

In the second case, the unit 29 directly determines the deviation $\delta f_4$ between the receiver sampling frequency and the transmitter sampling frequency from the received data.

For example, from the estimation of the time position of the analysis window $t_n$ with respect to the useful data of the nth OFDM symbol, the unit 29 averages the variations $(t_n - t_{n-1})$ in this time position between two consecutive symbols and then determines the estimation $\delta f_e$ of the sampling frequency shift $\delta f_e$ by means of the following equation:

$$\delta f'_e = \frac{\overline{t_n - t_{n-1}}}{T_S} \cdot f_e^R$$

where $\overline{t_n - t_{n-1}}$ represents an average of the variations in analysis window position between consecutive symbols.

Another possibility can consist of using the phase differences on reception (which vary according to the carriers under consideration) between two consecutive known symbols. These phase shifts are in fact directly related to the deviation $\delta f_e$ between the current receiver sampling frequency $f_e^R$ and the transmitter sampling frequency $f_e^E$ and thus make it possible to estimate it.

The receiver 20 also has a unit 30 which delivers, on the basis of the receiver and transmitter sampling frequency deviation signal delivered by the estimation unit 29, a signal representing the phase shift $\beta_{k,n}$ between two symbols as a result of the change in the position of the analysis window. This signal representing the phase shift $\beta_{k,n}$ is delivered to the estimation unit 23.

It should be noted that this signal representing the phase shift $\beta_{k,n}$ can be an estimation $\tilde{\beta}_{k,n}$ of this phase shift.

Figure 2:
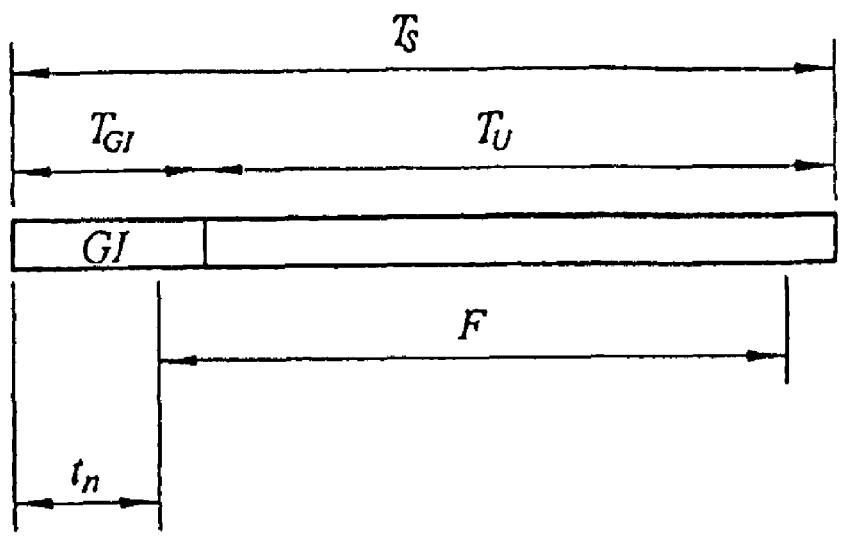
FIG. 2 shows the structure of an OFDM symbol.

It can be shown that an estimation $C'_{k,n}$ of the element of the nth OFDM symbol which modulates the sub-carrier of index k issuing from the Fourier transform used by the demodulation unit 22 can be written in the form:

$$C'_{k,n} = H_{k,n} C_{k,n} e^{-j2\pi k(T_{GI} - t_n)/T_u} = H_{k,n} C_{k,n} e^{j\theta_{k,n}}$$

where $H_{k,n}$ represents the frequency response of the channel, $\theta_{k,n}$ is the phase allocated to the element of the nth OFDM symbol modulating the sub-carrier k denoted $C_{k,n}$, $T_{GI}$ is the duration of the guard time, $T_u$ is the duration of the useful part of the said symbol and $t_n$ represents the time position of the analysis window F with respect to the start of the nth symbol $C_{k,n}$ received (see FIG. 2). The phase $\theta_{k,n}$ is determined by the time position $t_n$ of the analysis window F as resulting from the following expression:

$$\theta_{k,n} = -2\pi k(T_{GI} - t_n)$$

The estimation unit 23 consequently sees a response $\tilde{H}_{k,n}$ of the channel 30 which is modified and which is now written:

$$\tilde{H}_{k,n} = H_{k,n} e^{j\theta_{k,n}}$$

Thus, the result of the drift in the position of the analysis window $t_n$ with respect to the symbol is an apparent modification of the pulse response $\tilde{H}_{k,n}$ of the transmission channel 30.

A variation $(t_n - t_{n-1})$ in the time position of the analysis windows of two consecutive symbols therefore gives rise to a phase shift of the sub-carrier k equal to:

$$\beta_{k,n} = \theta_{k,n} - \theta_{k,n-1} = 2\pi k(t_n - t_{n-1})/T_u$$

If this shift $(t_n - t_{n-1})$ is due only to the slow drift related to the non-slaving of the sampling frequency $f_e^E$, it is possible to write:

$$(t_n - t_{n-1}) = \delta T_s$$

where $\delta$ is the degree of frequency shift and is given by the following equation:

$$\delta f_e = f_e^R - f_e^E = -f_e^E \delta$$

The value of the phase shift of the sub-carrier k for the nth symbol is therefore equal to:

$$\beta_{k,n} = 2\pi k \delta T_s / T_u$$

This expression can also be written, considering this time the number of samples N in the analysis window and the number of samples $\Delta$ corresponding to the guard time:

$$\beta_{k,n} 2\pi k \delta (N+\Delta)/N$$

where $N = T_u \cdot f_e^E$ and $\Delta = T_{GI} \cdot f_e^E$

It should be stated that $T_s$ represents the total length of the OFDM symbol. This gives:

$$T_s = T_u + T_{GI}$$

In the embodiment depicted in FIG. 3, the receiver 20 has a unit 31 which is provided for delivering a window advance or retard signal $\alpha$ expressed, for example, as a number of samples. To do this, it estimates, for example, the pulse response of the transmission channel and then determines the time position of the first peak of this response. This position makes it possible to estimate the position $t_n$ of the analysis window with respect to the useful part of the symbol (see FIG. 2).

Depending on the value of this position, the unit 31 decides to advance or move back the current analysis window by one or more sample time units represented by the signal $\alpha$ which is then delivered to the unit 28 in order to determine a new analysis window.

The signal $\alpha$ delivered by the unit 31 makes it possible to readjust regularly the analysis window used by the unit 22 for calculating the Fourier transform. In the case of a burst or a frame of relatively small length, this readjustment can be performed at the start of the frame (or the burst) with no consequence on the demodulation of the data. In the contrary case, it will cause a phase shift (variable depending on the carrier under consideration), completely analogous to the phase shift caused by the regular slippage of the analysis window due to the error on the frequency $f_e^E$.

The unit 30 can also take into account the part of the shift which results from an intentional action on the time base 28 by means of the window positioning signal $\alpha$ delivered by the unit 31. In this case, the variation between consecutive symbols of the position of the analysis window $(t_n - t_{n-1})$ can be written in the form $$t_n - t_{n-1} = \delta \cdot Ts + \alpha \cdot T$$

where $\delta = -\delta f_e^1/f_e^R$ and T is the duration of a sample $(T = 1/f_e^R)$.

Thus, the phase shift $\beta_{k,n}$ of the sub-carrier k for the nth symbol is equal to:

$$\beta_{k,n} = 2\pi k(t_n - t_{n-1})/T_u = 2\pi k(\delta \cdot Ts + \alpha \cdot T)/T_u$$

For example, for $\delta = 10^{-5}$, $N/\Delta = 4$, $k = 3405$, a phase shift $\beta_{3405} = 0.26$ radians is obtained.

According to another embodiment, not depicted, the unit 30 delivers a signal representing the phase shift $\beta_{k,n}$ between two consecutive OFDM symbols which is related solely to the window advance or retard signal $\alpha$. In this case, the variation between consecutive symbols of the position of the analysis window $(t_n - t_{n-1})$ can be written in the form:

$$t_n - t_{n-1} = \alpha \cdot T$$

where T is the duration of a sample $(T = 1/f_e^R)$ and $\alpha$ is the window advance or retard signal delivered by a unit 31.

Thus, the phase shift $\beta_{k,n}$ of the sub-carrier k for the nth symbol is equal to:

$$\beta_{k,n} = 2\pi k(t_n - t_{n-1})/T_u = 2\pi k \alpha \cdot T / T_u$$

The precise way in which the estimation unit 23 proceeds in order to correct, not only the effect of the transmission channel 30, but also the phase shift which is related to the position of the analysis window and its drift, depends on the type of demodulation used by the demodulation unit 23 (see FIGS. 1 and 3): synchronous with one reference symbol or a number of consecutive reference symbols, synchronous with distributed pilots, or differential.

Figure 4A:
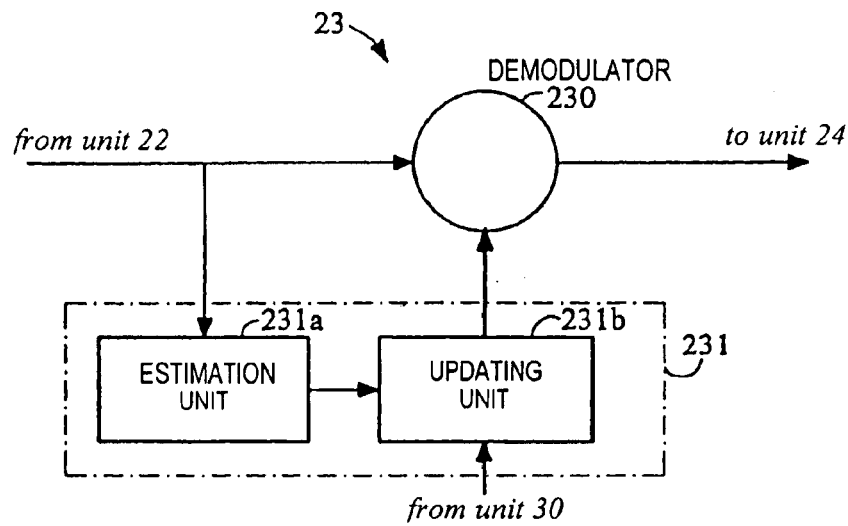
FIGS. 4a, 4b, and 4c are respectively block diagrams of three estimation units according to embodiments depending on the binary to signal coding performed on the transmitter side.

FIG. 4a depicts a block diagram of a symbol estimation unit 23 of the type performing a coherent demodulation of a modulated signal having, generally transmitted at the start of the frame or burst, at least one reference symbol. This estimation unit 23 receives the signal $Y_{k,n}$ issuing from the demodulation unit 22 depicted in FIG. 3 and delivers to the decoding unit 24 the estimated signal $C'_{k,n}$ corresponding to the element modulating the kth sub-carrier of the nth OFDM symbol. It also receives from the unit 30 depicted in FIG. 3 the estimated value of the phase shift between two consecutive symbols $\beta'_{k,n}$.

The unit 23 has a demodulator 230 to which is supplied an estimation of the frequency response of the channel $\tilde{H}_{k,n}$ determined by an estimation and updating unit 231. The latter has a unit for estimating the response of the channel 231a which makes it possible to estimate the response of the channel for the reference symbol or symbols (n=0, 1, ..., t-1, where t is the number of consecutive reference symbols). It also has an updating unit 231b which determines the response of the channel by means of the following recursive equation:

$$\tilde{H}_{k,n} = \tilde{H}_{k,n-1} e^{j\beta_{k,n}}$$

The demodulator 230 then estimates the element modulating the kth sub-carrier of the nth OFDM symbol by means of the following equation:

$$C'_{k,n} = (\tilde{H}'_{k,n})^{-1} Y_{k,n}$$

In the case of a coherent demodulation designed to perform the demodulation of a signal having distributed pilots, the estimation unit 23 first estimates the response of the transmission channel where the pilots were transmitted (in the time-frequency plane of the OFDM signal) and then interpolates, time-wise and frequency-wise, in order to estimate the frequency response of the channel $H_{k,n}$ at all frequencies and for all symbols. To do this, the estimation unit 23 can have an interpolation filter which is for example of the two-dimensional type (time+frequency).

It should be stated that the pilots are data which are transmitted in the OFDM frame in a distributed manner in the time-frequency domain. These transmitted data are known by the receiver.

The variations in the phase shifts $\theta_{k,n}$ on the frequency axis are not an inconvenience. This is because the frequency response of the channel $H_{k,n}$ itself varies rapidly as a function of the frequency, and an interpolation filter is capable of taking these variations into account. On the other hand, as a result of the values of the frequency response of the channel $H_{k,n}$ not being supposed to vary too quickly along the time axis, an interpolation filter can be disrupted if the drift of the sampling frequency $\delta f_e$ is too great.

Figure 4B:
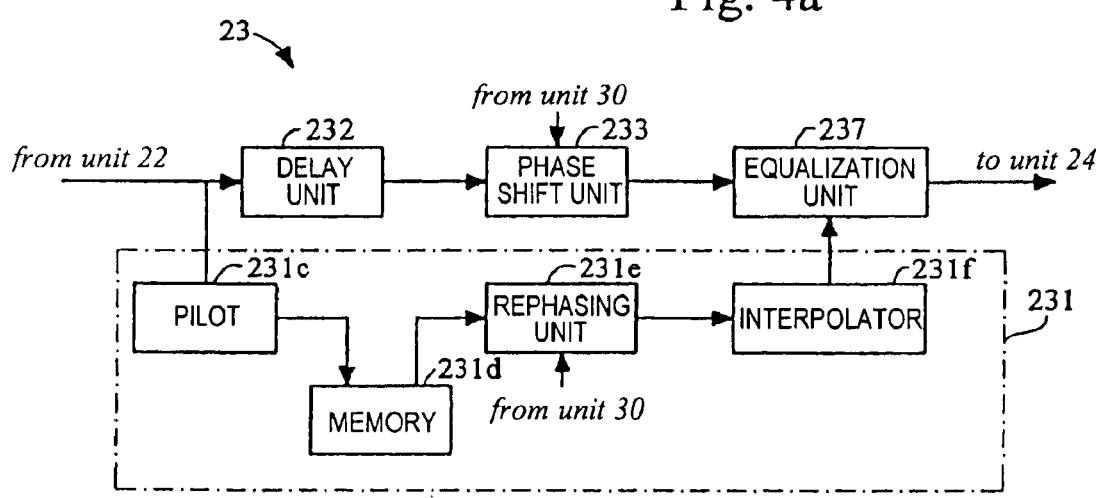

FIG. 4b depicts a particular embodiment of an estimation unit 23 designed to perform the demodulation of a signal having distributed pilots. This estimation unit 23 has a unit for estimating the response of the channel 231 itself composed of a unit for estimating on pilot 231c intended to estimate the frequency response of the channel solely on the pilots. These different estimations are stored in a memory 231d, and then rephased in a unit 231e, which receives from the unit 30 (FIG. 3) the value of the phase shift between consecutive symbols $\beta'_{k,n}$. The estimation unit 231 also has an interpolation unit 231f which, on the basis of the rephased signals for channel estimation on the pilots, delivers an estimation of the frequency response of the channel $\hat{H}_{k,n}$ for all carriers k and all instants n.

The estimation unit 23 of FIG. 4b also has a unit 232 intended to introduce a delay corresponding to that introduced by the unit 231. It also has a unit 233 which introduces into the delayed data issuing from the unit 232 a phase shift equal to the value $(\theta'_{k,n}-\theta'_{k,n-p})$ that is:

$$\theta'_{k,n} - \theta'_{k,n-p} = \sum_{j=0}^{p-1} \beta'_{k,n-j}$$

where p is the latency of the interpolation unit 231f. This makes it possible to rephase the delayed data with the estimations supplied by the unit 231, in view of the drift of the sampling frequency $\delta f_e$ and the adjustments of the estimation window during this delay. The values of the phase shifts $\beta'_{k,n-j}$ are supplied by the unit 30.

The rephased data are supplied to an equalization unit 237 which then delivers the demodulated symbols to a decoding unit 24 (FIG. 3).

Figure 4C:
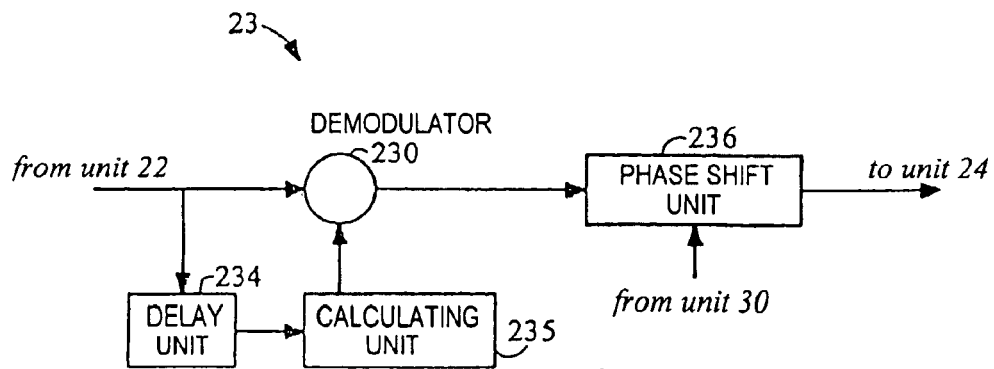

FIG. 4c depicts an estimation unit 23 of the type for demodulating signals modulated by differential modulation. It should be stated that, in this case, the useful data $D_{k,n}$ were modulated according to the following equation:

$$C_{k,n}=D_{k,n}C_{k,n-1}$$

The corresponding demodulation is performed in the unit 230. The estimation unit 23 has a delay unit 234 which delays by one OFDM symbol (of length $T_s$) the input signal issuing from the demodulation unit 22 and a unit 235 which calculates the conjugate of the delayed symbol. The signal demodulated in the unit 230 can then be written as follows:

$$Y_{k,n}Y^*_{k,n-1}=(H_{k,n}H^*_{k,n-1})e^{j\beta'_{k,n}}D_{k,n}+\text{noise}\approx|H_{k,n}|^2e^{j\beta'_{k,n}}D_{k,n}$$

This signal is supplied to a phase shift unit 236 receiving from the unit 30 the value of phase shift $\beta'_{k,n}$ between consecutive symbols. The unit 236 then delivers a demodulated signal of the form:

$$D'_{k,n}=Y_{k,n}Y^*_{k,n-1}e^{-j\beta'_{k,n}}\approx|H_{k,n}|^2D_{k,n}$$

What is claimed is:

1. Method of transmitting data on multiple carriers from a transmitter to a receiver, comprising:

on the transmitter side, binary to signal coding of the data to be transmitted so as to form modulation signals, modulating a plurality of sub-carriers with said modulation signals so as to form signals, referred to as OFDM symbols, transmitting, over a channel between said transmitter and said receiver, said OFDM symbols at a rate which is related to a sampling frequency referred to as the transmitter sampling frequency, and on the receiver side, determining, from a clock signal at a frequency related to a sampling frequency referred to as the receiver sampling frequency, an analysis window for the signal received from the transmitter so as to form a block of samples, and estimating said transmitted modulation signals by demodulating said sub-carriers for said block of samples under consideration, wherein said estimation comprising correcting the changes in the position of the analysis window with respect to said transmitted signal without slaving said receiver sampling frequency.

2. Data transmission method according to claim 1, wherein:

said estimation comprising demodulating said sub-carriers for said block of samples under consideration and then correcting the effects of the transmission channel between the transmitter and the receiver, said correcting the changes in the position of the analysis window consisting of estimating the phase difference between two consecutive symbols and using this phase difference during said correction of the effects of the transmission channel between the transmitter and the receiver.

3. Method of transmitting data on multiple carriers from a transmitter to a receiver, comprising:

on the transmitter side, binary to signal coding of the data to be transmitted so as to form modulation signals, modulating a plurality of sub-carriers with said modulation signals so as to form signals, referred to as OFDM symbols, and transmitting, over a channel between said transmitter and said receiver, said OFDM symbols at a rate which is related to a sampling frequency referred to as the transmitter sampling frequency, and on the receiver side, determining, from a clock signal at a frequency related to a sampling frequency referred to as the receiver sampling frequency, an analysis window for the signal received from the transmitter so as to form a block of samples, and estimating said transmitted modulation signals by demodulating said sub-carriers for said block of samples under consideration, wherein said estimation comprising correcting the changes in the position of the analysis window with respect to said transmitted signal; and wherein said estimation comprising demodulating said sub-carriers for said block of samples under consideration and then correcting the effects of the transmission channel between the transmitter and the receiver, said correcting the changes in the position of the analysis window consisting of estimating the phase difference between two consecutive symbols and using this phase difference during said correction of the effects of the transmission channel between the transmitter and the receiver;

wherein for estimating the phase difference between two consecutive symbols said method comprising estimating the degree of shift of the sampling frequency of the receiver with respect to that of the transmitter, $$\delta = \delta f_e/f_e^E = (f_e^R - f_e^E)/f_e^E$$

said phase difference between two consecutive symbols then being equal to:

$$\beta_{k,n} = 2\Pi k \delta T_s/T_u$$

where $T_s$ is the total length of the symbol under consideration, $T_u$ its useful part, k being the index of the carrier under consideration and n being the index of the OFDM symbol under consideration.

4. Method of transmitting data on multiple carriers from a transmitter to a receiver, comprising:

on the transmitter side, binary to signal coding of the data to be transmitted so as to form modulation signals, modulating a plurality of sub-carriers with said modulation signals so as to form signals, referred to as OFDM symbols, and transmitting, over a channel between the said transmitter and the said receiver, said OFDM symbols at a rate which is related to a sampling frequency referred to as the transmitter sampling frequency, and on the receiver side, determining, from a clock signal at a frequency related to a sampling frequency referred to as the receiver sampling frequency, an analysis window for the signal received from the transmitter so as to form a block of samples, and estimating said transmitted modulation signals by demodulating said sub-carriers for said block of samples under consideration, wherein said estimation comprising correcting the changes in the position of the analysis window with respect to said transmitted signal; and wherein said estimation comprising demodulating said sub-carriers for said block of samples under consideration and correcting the effects of the transmission channel between the transmitter and the receiver, said correcting the changes in the position of the analysis window consisting of estimating the phase difference between two consecutive symbols and using this phase difference during said correction of the effects of the transmission channel between the transmitter and the receiver;

wherein estimating the phase difference between two consecutive symbols includes taking into account the shift decision for the position of said analysis window delivered by a window repositioning unit, said phase difference between two consecutive symbols then being equal to:

$$\beta_{k,n} = 2\Pi k \alpha T/T_u$$

where T is the duration of a sample and α the shift decision value expressed as a number of samples.

5. Method of transmitting data on multiple carriers from a transmitter to a receiver, comprising:

on the transmitter side, binary to signal coding of the data to be transmitted so as to form modulation signals, modulating a plurality of sub-carriers with said modulation signals so as to form signals, referred to as OFDM symbols, and transmitting, over a channel between the said transmitter and the said receiver, said OFDM symbols at a rate which is related to a sampling frequency referred to as the transmitter sampling frequency, and on the receiver side, determining, from a clock signal at a frequency related to a sampling frequency referred to as the receiver sampling frequency, an analysis window for the signal received from the transmitter so as to form a block of samples, and estimating said transmitted modulation signals by demodulating the said sub-carriers for said block of samples under consideration, wherein said estimation comprising correcting the changes in the position of the analysis window with respect to the said transmitted signal; and wherein said estimation comprising demodulating the said sub-carriers for said block of samples under consideration and then correcting the effects of the transmission channel between the transmitter and the receiver, said correcting the changes in the position of the analysis window consisting of estimating the phase difference between two consecutive symbols and using this phase difference during said correction of the effects of the transmission channel between the transmitter and the receiver;

wherein for estimating the phase difference between two consecutive symbols said method comprising estimating the degree of shift of the sampling frequency of the receiver with respect to that of the transmitter, $$\delta = \delta f_e/f_e^E = (f_e^R - f_e^E)/f_e^E$$

said phase difference between two consecutive symbols then being equal to:

$$\beta_{k,n} = 2\Pi k \delta T_s/T_u$$

where $T_s$ is the total length of the symbol under consideration, $T_u$ its useful part, k being the index of the carrier under consideration and n being the index of the OFDM symbol under consideration;

wherein for estimating the phase difference between two consecutive symbols said method comprising taking into account the shift decision for the position of the said analysis window delivered by a window repositioning unit, said phase difference between two consecutive symbols then being equal to:

$$\beta_{k,n} = 2\Pi k (\delta T_s + \alpha T)/T_u$$

where T is the duration of a sample and α the shift decision value expressed as a number of samples.

6. Method of transmitting data on multiple carriers from a transmitter to a receiver, comprising:

on the transmitter side, binary to signal coding of the data to be transmitted so as to form modulation signals, modulating a plurality of sub-carriers with said modulation signals so as to form signals, referred to as OFDM symbols, and transmitting, over a channel between said transmitter and said receiver, said OFDM symbols at a rate which is related to a sampling frequency referred to as the transmitter sampling frequency, and on the receiver side, determining, from a clock signal at a frequency related to a sampling frequency referred to as the receiver sampling frequency, an analysis window for the signal received from the transmitter so as to form a block of samples, and estimating said transmitted modulation signals by demodulating said sub-carriers for said block of samples under consideration, wherein said estimation comprising correcting the changes in the position of the analysis window with respect to said transmitted signal;

estimating the response of the channel for one or more reference symbols transmitted at the same time as said transmitted symbols and of applying said phase difference between consecutive symbols to said transmission channel estimation by means of the following recursive equation:

$$\tilde{H}_{k,n} = \tilde{H}_{k,n-1} e^{j\beta'_{k,n}}$$

where $\tilde{H}_{k,n} = \tilde{H}_{k,n-1} e^{j\beta'_{k,n}}$ represents the estimation of the channel response for the carrier of index k and for the OFDM symbol of index n, $\beta'_{k,n}$ being the estimation of the phase difference between the consecutive OFDM symbols of respective indices n−1 and n for the carrier of index k.

7. Data transmission method according to claim 2, further comprising:

estimating the response of the transmission channel for one or more distributed pilots transmitted at the same time as said transmitted symbols, interpolating, time-wise and frequency-wise, the frequency response of the channel at all frequencies and for all symbols, and applying said phase difference between consecutive symbols to said transmission channel estimation.

8. Data transmission method according to claim 3, according to which the binary to signal coding is of the differential type, further comprising shifting the phase, by said phase difference between consecutive OFDM symbols, of the result of differential demodulation for the carrier of index k of the nth OFDM symbol.

9. Receiver and transmitter in a system for transmitting data on multiple carriers, comprising:

a receiver designed to receive signals transmitted by a transmitter, said transmitter being designed for binary to signal coding of the data to be transmitted so as to form modulation signals, for modulating a plurality of sub-carriers with the said modulation signals so as to form symbols, referred to as OFDM symbols, and then for transmitting said OFDM symbols at a rate which is related to a sampling frequency referred to as the transmitter sampling frequency, said receiver being designed to determine, from a clock signal at a frequency related to a sampling frequency referred to as the receiver sampling frequency, an analysis window for the signal received from the transmitter so as to form a block of samples and to estimate the said transmitted modulation signals by demodulating the said sub-carriers for the said block of samples under consideration, wherein said receiver comprising components to correct the changes in the position of the analysis window with respect to the said transmitted signal without slaving said receiver sampling frequency.

10. Receiver according to claim 9, wherein for estimating said transmitted modulation signals, said receiver comprising means for demodulating said sub-carriers for said block of samples under consideration and means for correcting the effects of the transmission channel between the transmitter and the receiver, and in that, for correcting the changes in the position of the analysis window, having means for estimating the phase difference between two consecutive symbols, said phase difference being used by the means for correcting the effects of the transmission channel between the transmitter and the receiver.

11. Receiver and transmitter in a system for transmitting data on multiple carriers, comprising:

a receiver designed to receive signals transmitted by a transmitter, said transmitter being designed for binary to signal coding of the data to be transmitted so as to form modulation signals, for modulating a plurality of sub-carriers with said modulation signals so as to form symbols, referred to as OFDM symbols, and then for transmitting said OFDM symbols at a rate which is related to a sampling frequency referred to as the transmitter sampling frequency, said receiver being designed to determine, from a clock signal at a frequency related to a sampling frequency referred to as the receiver sampling frequency, an analysis window for the signal received from the transmitter so as to form a block of samples and to estimate said transmitted modulation signals by demodulating the said sub-carriers for the said block of samples under consideration, wherein said receiver comprising components to correct the changes in the position of the analysis window with respect to said transmitted signal;

wherein for estimating said transmitted modulation signals, said receiver comprising means for demodulating the said sub-carriers for said block of samples under consideration and means for correcting the effects of the transmission channel between the transmitter and the receiver, and in that, for correcting the changes in the position of the analysis window, having means for estimating the phase difference between two consecutive symbols, said phase difference being used by the means for correcting the effects of the transmission channel between the transmitter and the receiver;

wherein for estimating the phase difference between two consecutive symbols, said receiver comprising components to estimate the degree of shift of the sampling frequency of the receiver with respect to that of the transmitter, $$\delta = \delta f_e / f_e^E = (f_e^R - f_e^E) / f_e^E$$

said phase difference between two consecutive symbols then being equal to:

$$\beta_{k,n} = 2\Pi k \delta T_s / T_u$$

where $T_s$ is the total length of the symbol under consideration, $T_u$ its useful part, k being the index of the carrier under consideration and n being the index of the OFDM symbol under consideration.

12. Receiver and transmitter in a system for transmitting data on multiple carriers, comprising:

a receiver designed to receive signals transmitted by a transmitter, said transmitter being designed for binary to signal coding of the data to be transmitted so as to form modulation signals, for modulating a plurality of sub-carriers with said modulation signals so as to form symbols, referred to as OFDM symbols, and then for transmitting said OFDM symbols at a rate which is related to a sampling frequency referred to as the transmitter sampling frequency, said receiver being designed to determine, from a clock signal at a frequency related to a sampling frequency referred to as the receiver sampling frequency, an analysis window for the signal received from the transmitter so as to form a block of samples and to estimate said transmitted modulation signals by demodulating said sub-carriers for said block of samples under consideration, wherein said receiver comprising components to correct the changes in the position of the analysis window with respect to said transmitted signal;

wherein for estimating said transmitted modulation signals, said receiver comprising means for demodulating said sub-carriers for said block of samples under consideration and means for correcting the effects of the transmission channel between the transmitter and the receiver, and in that, for correcting the changes in the position of the analysis window, having means for estimating the phase difference between two consecutive symbols, said phase difference being used by the means for correcting the effects of the transmission channel between the transmitter and the receiver;

wherein for estimating the phase difference between two consecutive symbols, said receiver comprising components to take into account the shift decision for the position of said analysis window delivered by a window repositioning unit, said phase difference between two consecutive symbols then being equal to:

$$\beta_{k,n} = 2\Pi k(\alpha T)/T_u$$

where T is the duration of a sample and α the shift decision value expressed as a number of samples.

13. Receiver and transmitter in a system for transmitting data on multiple carriers, comprising:

a receiver designed to receive signals transmitted by a transmitter, said transmitter being designed for binary to signal coding of the data to be transmitted so as to form modulation signals, for modulating a plurality of sub-carriers with said modulation signals so as to form symbols, referred to as OFDM symbols, and then for transmitting said OFDM symbols at a rate which is related to a sampling frequency referred to as the transmitter sampling frequency, said receiver being designed to determine, from a clock signal at a frequency related to a sampling frequency referred to as the receiver sampling frequency, an analysis window for the signal received from the transmitter so as to form a block of samples and to estimate said transmitted modulation signals by demodulating said sub-carriers for said block of samples under consideration, wherein said receiver comprising components to correct the changes in the position of the analysis window with respect to said transmitted signal;

wherein for estimating said transmitted modulation signals, said receiver comprising means for demodulating said sub-carriers for said block of samples under consideration and means for correcting the effects of the transmission channel between the transmitter and the receiver, and in that, for correcting the changes in the position of the analysis window, having means for estimating the phase difference between two consecutive symbols, said phase difference being used by the means for correcting the effects of the transmission channel between the transmitter and the receiver;

wherein for estimating the phase difference between two consecutive symbols, said receiver comprising components to estimate the degree of shift of the sampling frequency of the receiver with respect to that of the transmitter, $$\delta = \delta f_e/f_e^E = (f_e^R - f_e^E)/f_e^E$$

said phase difference between two consecutive symbols then being equal to:

$$\beta_{k,n} = 2\Pi k \delta T_s/T_u$$

where $T_s$ is the total length of the symbol under consideration, $T_u$ its useful part, k being the index of the carrier under consideration and n being the index of the OFDM symbol under consideration;

wherein for estimating the phase difference between two consecutive symbols, said receiver comprising components to take into account the shift decision for the position of the said analysis window delivered by a window repositioning unit, said phase difference between two consecutive symbols then being equal to:

$$\beta_{k,n} = 2\Pi k(\delta T_s + \alpha T)/T_u$$

where T is the duration of a sample and α the shift decision value expressed as a number of samples.

14. Receiver and a transmitter in a system for transmitting data on multiple carriers, a receiver designed to receive signals transmitted by a transmitter, said transmitter being designed for binary to signal coding of the data to be transmitted so as to form modulation signals, for modulating a plurality of sub-carriers with said modulation signals so as to form symbols, referred to as OFDM symbols, and then for transmitting said OFDM symbols at a rate which is related to a sampling frequency referred to as the transmitter sampling frequency, said receiver being designed to determine, from a clock signal at a frequency related to a sampling frequency referred to as the receiver sampling frequency, an analysis window for the signal received from the transmitter so as to form a block of samples and to estimate said transmitted modulation signals by demodulating said sub-carriers for the said block of samples under consideration, wherein said receiver comprising components to correct the changes in the position of the analysis window with respect to said transmitted signal;

wherein said receiver comprising components to estimate the response of the channel for one or more reference symbols transmitted, by said transmitter, at the same time as said transmitted symbols and to apply said phase difference between consecutive symbols to said transmission channel estimation by means of the following recursive equation:

$$\tilde{H}_{k,n} = \tilde{H}_{k,n-1} e^{j\beta'_{k,n}}$$

where $\tilde{H}_{k,n}=\tilde{H}_{k,n-1}e^{j\beta'_{k,n}}$ represents the estimation of the channel response for the carrier of index k and for the OFDM symbol of index n, $\beta'_{k,n}$ being the estimation of the phase difference between the consecutive OFDM symbols of respective indices n−1 and n for the carrier of index k.

15. Receiver according to claim 10, said receiver comprising components to estimate the response of the transmission channel for one or more distributed pilots transmitted at the same time as said transmitted symbols, to interpolate, time-wise and frequency-wise, the frequency response of the channel at all frequencies and for all symbols and to apply said phase difference between consecutive symbols to said transmission channel estimation.

16. Receiver according to claim 9, said binary to signal coding performed by said transmitter being of the differential type, said receiver comprising components to shift the phase, by said phase difference between consecutive OFDM symbols, of the result of the differential demodulation for the carrier of index k of the nth OFDM symbol.

17. A method of receiving data transmitted on multiple carriers, comprising:

receiving a signal transmitted over a channel, said signal including a plurality of carriers and a plurality of symbols modulated on to the carriers at a transmitter sampling frequency;

converting said received signal into a digital signal to output said symbols at a receiver sampling frequency;

determining a time window for said symbol output to form a group of samples to demodulate;

demodulating said group of samples using an estimation of deviation between said transmitter and receiving sampling frequency, the deviation estimation based on predetermined variation of time window position, to recover at least a portion of the transmitted symbols without slaving the receiver sampling frequency.

18. The method of claim 17, wherein said demodulating includes determining the deviation estimation from determining phase shift between two symbols of the transmitted signal.

19. The method of claim 17, wherein said demodulating includes varying the time window position in relation to said deviation estimation to recover said at least a portion of the transmitted symbols.

20. A receiving system for receiving data transmitted on multiple carriers, comprising:

a receiver for receiving a signal transmitted over a channel, said signal including a plurality of carriers and a plurality of symbols modulated on to the carriers at a transmitter sampling frequency;

a converter for converting said received signal into a digital signal to output said symbols at a receiver sampling frequency;

a controller for determining a time window for said symbol output to form a group of samples to demodulate;

at least one demodulator for demodulating said group of samples using an estimation of deviation between said transmitter and receiving sampling frequency, the deviation estimation based on predetermined variation of time window position, to recover at least a portion of the transmitted symbols without slaving the receiver sampling frequency.

21. The system of claim 20, wherein said at least one demodulator to determine the deviation estimation from determining phase shift between two symbols of the transmitted signal.

22. The system of claim 20, wherein said at least one demodulator to recover said at least a portion of the transmitted symbols from varying the time window position in relation to said deviation estimation.

* * * * *